BEACH & DAY.
Evaporating Pan.
No. 36,749.
Patented Oct. 21, 1862.
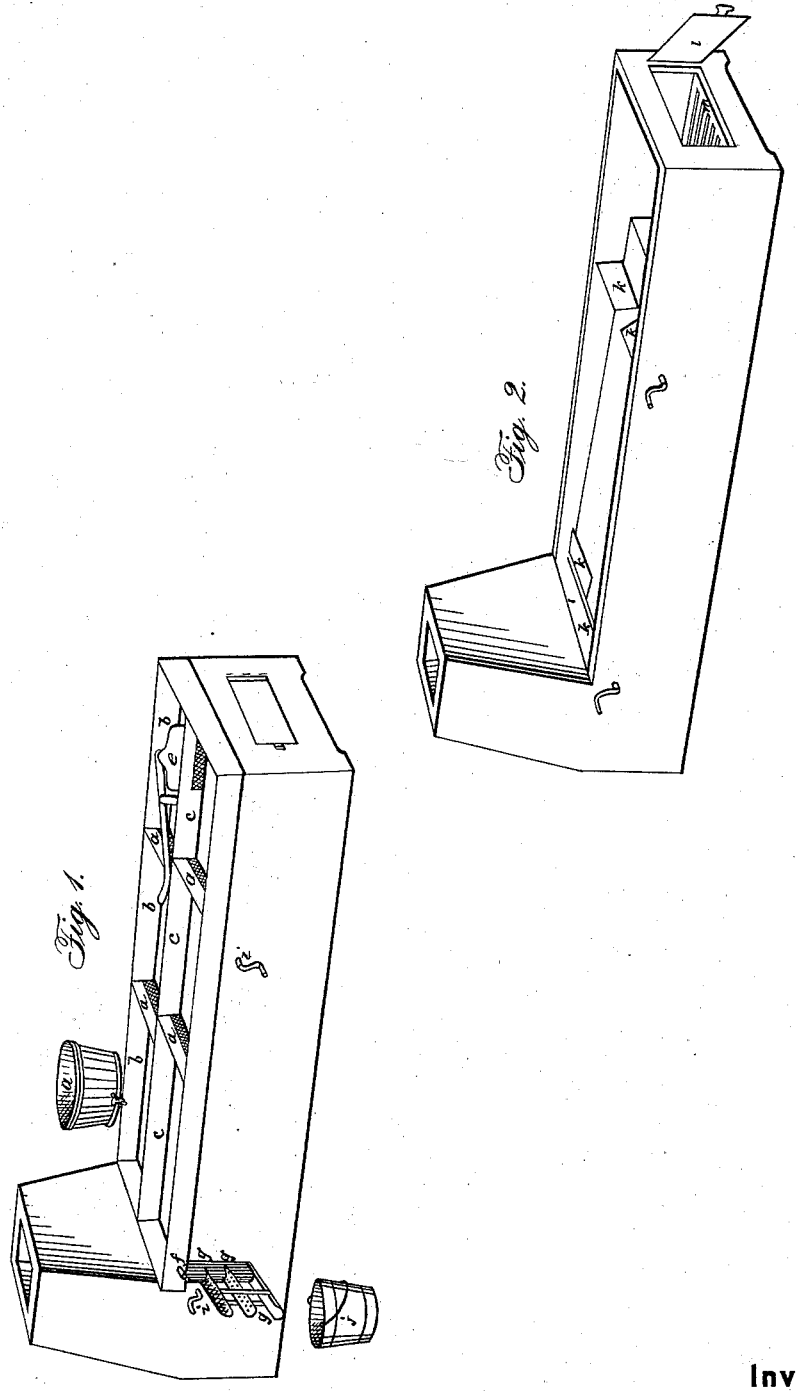
Witnesses:
Wm. Beble
J. W. Jayne
Inventor:
Volney R. Beach
Jube Day

UNITED STATES PATENT OFFICE.

VOLNEY R. BEACH AND JUBE DAY, OF INDEPENDENCE, ASSIGNORS TO THEMSELVES AND CHARLES L. PATRICK, OF BUCHANAN COUNTY, IOWA.

IMPROVED SUGAR-EVAPORATOR.

Specification forming part of Letters Patent No. 36,749, dated October 21, 1862.

*To all whom it may concern:*

Be it known that we, VOLNEY R. BEACH and JUBE DAY, of Independence, in the county of Buchanan, in the State of Iowa, have invented new and useful Improvements in the Construction of Evaporators of the Juice of Sugar-Cane, called "Beach & Day's Evaporator;" and we do declare that the following is a full and exact description thereof, reference being had to the accompanying drawings, making a part of this specification, in which—

Figure 1 is a perspective view as set for operation.

This evaporator is constructed of sheet metal of any kind, or with metal bottoms and wooden sides, with a partition made either of wood or metal, extending lengthwise of the pan, thereby forming two apartments. This partition is made with an aperture at one end to admit the circulation or passage of juice from the first into the second apartment, with a gate to control the flow, and a strainer inserted to cleanse the juice. The first apartment is supplied with raw juice from a cask or vessel set for that purpose at the end of the pan subject to the least degree of heat, where it may be gradually brought to the proper degree of heat and the scum removed by skimmers before its passage into the second apartment, which is used for boiling down and finishing into sirup at the end of the pan that is the least subject to heat, and consequently the least danger of scorching the sirup. The cross-partitions with strainers are introduced for the purpose of collecting the impurities of the cane-juice, and to facilitate the skimming as the scum rises to the surface, while the strainers admit the passage of cleansed juice at the bottom through the several sections of the evaporator until finished into sirup.

The cooler is made of wire-cloth or perforated tin, and attached to the evaporator under the spout distributing the sirup through strainers in small streams, exposing it to the air and cooling before its entrance into the receiving-cask, thereby improving the color and flavor of the sirup.

The fire-furnace may be constructed of brick or stone, with iron grates and dampers, the dampers to be used for controlling the current of fire under either the cleansing or finishing apartment, at the will of the operator.

In Fig. 1 the letter $a$ represents the cask which supplies the evaporator with raw juice. The letters $b\ b\ b$ represent the first or cleansing apartment; the letters $c\ c\ c$ the partition, extending lengthwise of the pan, with gate, letter $e$. The letters $d\ d\ d\ d$ are cross-partitions, with strainers at the bottom. The letter $f$ is the spout which discharges the sirup; the letters $g\ g\ g$, the cooler; the letter $j$, the cask for receiving the sirup. The letters $i\ i$ are dampers.

Fig. 2 shows the interior of the fire-furnace, with the evaporator removed. The letters $k\ k\ k\ k$ are dampers; the letter $m$, fire-grates; the letter $l$, the door to the furnace.

We do not claim the invention of a pan with gates and strainers and partitions, but We do claim as our invention and desire to secure by Letters Patent—

1. The construction of a pan with a central partition extending lengthwise with gate and strainer therein, for the uses and purposes herein set forth.

2. The arrangement of cross-partitions, with strainer at the bottom, in combination with the central partition, for the uses and purposes as herein set forth.

3. In combination with said pan and central partition, the construction of the cooler, for the uses and purposes as herein set forth.

4. In combination with an evaporator so constructed, the arrangement of dampers in the fire-furnace, for the uses and purposes as herein set forth.

VOLNEY R. BEACH.
JUBE DAY.

In presence of—
J. S. WOODWARD,
W. A. SHAW.